Patented Apr. 5, 1932

1,852,541

UNITED STATES PATENT OFFICE

LEO SCHLECHT AND EMIL KEUNECKE, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF METAL CARBONYLS

No Drawing. Application filed May 3, 1928, Serial No. 274,962, and in Germany May 4, 1927.

This invention relates to the production of metal carbonyls.

In the industrial production of metal carbonyls, substances which are in a compact form and therefore present only a small superficial area are unsuitable for reaction with carbon monoxid, because the carbonyl forming metal they contain cannot be brought into a form which is sufficiently reactive towards carbon monoxid, by the customary preliminary reducing treatment. Thus, for example, only very low yields of carbonyl can be obtained by using compact material such as scrap, alloy waste, turnings, or metallurgical intermediate or waste products. While the reactivity of the initial material towards carbon monoxid can be slightly improved by mechanical communition, such crushing or like process is a source of difficulty. In order to obtain a satisfactory effect, extensive crushing is required, which brings the material into the state of fine powder, so that by reason of the readiness, with which it gives rise to obstruction, it can no longer be successfully treated in high-pressure apparatus.

We have now found that such unsuitable initial materials containing metals or compounds thereof, yielding metal carbonyls with carbon monoxid, especially those materials which are in a compact form, may be brought into a form in which they are reactive towards carbon monoxid, by first subjecting them to a preliminary oxidizing treatment and then to a preliminary reducing treatment, these treatments being repeated if necessary. In this manner a material is obtained which still retains its lump form, but is nevertheless highly porous and therefore presents a large superficial area. The oxidation may be effected in any convenient manner, such for example as by heating with oxygen, air, water vapor, carbon dioxid and the like. The reduction treatment may be carried on under pressure if necessary. Care should be taken by a suitable selection of the conditions, for example low temperature, admixture of substances with a loosening action, keeping the reaction material in movement and the like, to prevent the material from sintering.

This process is of special advantage for the further treatment of the residue formed in the production of the carbonyls although it is also of great advantage in the production of carbonyl from metals which have not been subjected to a previous treatment for the production of carbonyls. It is known that, in the action of carbon monoxid on metals, the reactivity soon diminishes, and the formation of carbonyl comes practically to a complete standstill before all the metal has been converted into carbonyl. Although attempts have been made to restore the reactivity of the materials which have thus become inert, by heating them for some time in a current of reducing gases, such as hydrogen, the former reactivity of the metal toward carbon monoxid is not completely regained, and diminishes progressively on repetition of the carbon monoxid treatment and reduction, so that, after several repetitions of these operations, a metallic residue is left which cannot be reactiviated at all by treatment with hydrogen and will form only very small amounts of carbonyl with carbon monoxid. Such a residue however can be reconverted into a highly active material by oxidation and subsequent reduction, and can then be practically completely converted into carbonyl by carbon monoxid.

The following examples will further illustrate the said invention, but the invention is not limited thereto.

*Example 1*

Hammer scale in foliaceous lumps, with a side measurement of about 1 centimeter, is treated at 700° centigrade with a mixture of air and steam. The material consisting chiefly of ferroferric oxid, is converted by this treatment into ferric oxid, without losing its lumpy character. On being treated with carbon monoxid at 200° centigrade and under a pressure of 200 atmospheres, following upon reduction in a current of hydrogen at 500° centigrade, the material yields carbonyl in an amount corresponding to 98.5 per cent of the iron present. On the other hand the same hammer scale, previously ground to 1/200th of its original grain size and reduced with hydrogen at 500° centigrade without previous oxidation, furnishes on treatment with carbon monoxid under the same conditions, only an amount of carbonyl corresponding to 68.0 per cent of the theoretical amount of iron.

*Example 2*

Scrap iron in the form of turnings is heated to 600° centigrade in a current of air and steam, in a rotary furnace, until completely transformed into ferric oxid ($Fe_2O_3$). For the most part, the turnings retain their shape. The material is then reduced with hydrogen, first at 450° centigrade and afterwards, for a short time, at 500° centigrade. By treatment with carbon monoxid for four hours at 200° centigrade and under a pressure of 200 atmospheres, 94.3 per cent of the iron is converted into iron carbonyl, whereas turnings similarly reduced with hydrogen, without previous oxidation, yield only 2.6 per cent of the iron as carbonyl by treatment with carbon monoxid under the same conditons.

*Example 3*

Spongy cubical nickel in course of conversion into carbonyl, gives, after four repetitions of successive treatment with hydrogen at 350° centigrade alternating with exposure to a current of carbon monoxid at 140° centigrade and under a pressure of 200 atmospheres, a residue which still contains 15.1 per cent of the original amount of nickel, but can not be again activated by a fifth and protracted treatment with hydrogen, either at 350° centigrade or even at still higher temperatures. This residue is then heated in the first place to 550° centigrade in a current of air and steam, and then reduced with hydrogen at 350° centigrade. During subsequent treatment with carbon monoxid at 140° centigrade and under a pressure of 200 atmospheres, 82.6 per cent of the still remaining nickel is converted into carbonyl.

What we claim is:—

1. In the production of metal carbonyls from material containing a carbonyl-forming metal in a form capable of conversion into a higher stage of oxidation, which material when subjected to a reducing treatment scarcely reacts with carbon monoxide with the formation of metal carbonyl, the steps which comprise subjecting the said material first to an oxidative and then to a reductive treatment and then subjecting it to the action of carbon monoxide.

2. In the production of metal carbonyls from material containing a carbonyl-forming metal in a form capable of conversion into a higher stage of oxidation, which material when subjected to a reducing treatment scarcely reacts with carbon monoxide with the formation of metal carbonyl, the steps which comprise subjecting the said material first to oxidation and then to a treatment with hydrogen at reducing temperatures, and then subjecting it to the action of carbon monoxide.

3. In the production of metal carbonyls from material containing a carbonyl-forming metal in a form capable of conversion into a higher stage of oxidation, which material has not been subjected to a previous treatment for the production of metal carbonyls, and which when subjected to a reducing treatment scarcely reacts with carbon monoxide with the formation of metal carbonyl, the steps which comprise subjecting the said material first to oxidation and then to a reductive treatment, and then subjecting it to the action of carbon monoxide.

4. In the production of metal carbonyls from material containing a carbonyl-forming metal in a form capable of conversion into a higher stage of oxidation, which material has not been subjected to a previous treatment for the production of metal carbonyls, and which when subjected to a reducing treatment scarcely reacts with carbon monoxide with the formation of metal carbonyl, the steps which comprise subjecting the said material first to oxidation and then to a treatment with hydrogen at reducing temperatures, and then subjecting it to the action of carbon monoxide.

5. In the production of iron carbonyl from scrap iron by the action of carbon monoxide thereon, the steps which comprise subjecting the scrap iron heated to 600° C. to the action of air and steam until it is completely transformed into ferric oxid, reducing the oxid, with hydrogen at from 450° to 500° C., and then subjecting the resulting iron to the action of carbon monoxide.

In testimony whereof we have hereunto set our hands.

LEO SCHLECHT.
EMIL KEUNECKE.